United States Patent

[11] 3,591,960

[72] Inventors T. O. Paine
Administrator of the National Aeronautics and Space Administration in respect to an invention;
Lloyd J. Derr, 4624 Willa Lee Ave. LaCrescenta, Calif.; Robert A. Tobias, 1523 Harding Ave. Pasadeno, Calif.
[21] Appl. No. 851,298
[22] Filed Aug. 19, 1969
[45] Patented July 13, 1971

[54] THERMOSTATIC ACTUATOR
8 Claims, 3 Drawing Figs.

[52] U.S. Cl. .................................................. 60/23,
337/354, 337/359, 337/75, 236/68
[51] Int. Cl. .................................................. G05d 1/00
[50] Field of Search .......................................... 60/23;
73/363; 236/101, 68; 337/75, 354

[56] References Cited
UNITED STATES PATENTS
2,879,356  3/1959  Holmes ........................... 337/75 X
3,205,675  9/1965  Mathies .......................... 236/68 X Primary Examiner—Martin P. Schwadron
Assistant Examiner—A M. Zupcic
Attorneys—J. H. Warden, Monte F. Mott and G. T. McCoy ABSTRACT: A thermostatic actuator for imparting displacement to mechanical linkages and the like, having particular utility aboard spacecraft and characterized by the utilization of a rectilinearly reciprocating, spring-biased output shaft operatively coupled with a stack of superimposed individual bimetal disc members and a selectively operable electric heater including a resistance coil associated therewith adapted to heat the stack for achieving distortion of the individual disc members and an elongation of the stack to cause the output shaft to be axially extended against the bias of the spring and a bimetal latch coupled with the shaft adapted to latch the shaft against axial extension, at a first temperature, and to release the shaft for an extending displacement at elevated temperatures, whereby the actuator is selectively driven by energizing the heater.

PATENTED JUL 13 1971

3,591,960

LLOYD J DERR
ROBERT A. TOBIAS
INVENTORS

ATTORNEYS

THERMOSTATIC ACTUATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The instant invention relates to electrically energized, linear actuators for imparting a selective operative displacement to mechanical linkages, and more particularly to a thermostatic actuator which employs bimetal actuating means and an electrical resistance heater operatively coupled with the actuating means for achieving a driving displacement of an actuator output shaft.

2. Description of the Prior Art

Linear actuators heretofore have been selectively driven by employing electrically established and changing fields of magnetic fields. However, where an actuator is to be employed near a scientific payload, such as that commonly delivered in space probes, the inductance coils employed in driving solenoids, geared motors and the like tend to develop magnetic fields which interfere with scientific experiments being performed. For example, where a spacecraft is being employed to deliver a science payload including a magnetometer, difficulty is experienced in isolating the magnetometer from the various magnetic coils employed in the various electrically driven actuators. Since it is important that scientific experiments be carried out with precision, it is desirable that the means employed in driving mechanically actuatable environmental devices be compatible with the selected experiments, particularly those employed in determining the magnetic field of a given celestial body.

Bimetal actuators have been employed in space probes. However, these actuators normally include a helically wound bimetal member having one end thereof secured to a pivotally supported shaft with the other end being fixedly secured in a convenient manner so that as temperature changes are experienced aboard the spacecraft, the bimetal member serves to impart torque to the shaft. While such devices function quite satisfactorily for their intended purposes, it has been found that they fail to develop the necessary output force which frequently is required for driving selected mechanical linkages included aboard a spacecraft.

OBJECTS AND SUMMARY OF THE INVENTION

This invention overcomes the aforementioned difficulties through the use of a thermostatic actuator which employs a stack of individual bimetal members operatively coupled with a rectilinearly reciprocating output shaft, an electrical resistance heater coil and a shaft-restraining latch, also formed of bimetal material, interconnected in a manner such that the temperature of the latch and the stack of bimetal members may be varied through a selective energization of the heater coil for achieving a selective linear displacement of the shaft for thereby achieving actuation of mechanical linkages.

Accordingly, an object of the instant invention is to provide an improved linear actuator.

Another object is to provide a linear actuator for use in spacecraft which responds to a selective energization of a resistance coil for achieving selective rectilinear displacement of an actuator output shaft.

Another object is to provide a linear actuator having a rectilinearly reciprocating output shaft and bimetal actuator operatively connected with the shaft adapted to respond to temperature changes for driving said shaft in a predetermined direction and a bimetal latch associated with the shaft adapted to retain the shaft against displacement in a first direction at a predetermined temperature and to release the shaft for linear displacement in response to predetermined changes in temperature and a selectively energizable electrical resistance heater coil associated with bimetal members adapted to impose selective temperature changes on the bimetal members and on the latch for achieving a selective actuation of the output shaft.

DESCRIPTION OF THE PREFERRED EMBODIMENT

Figure 1:
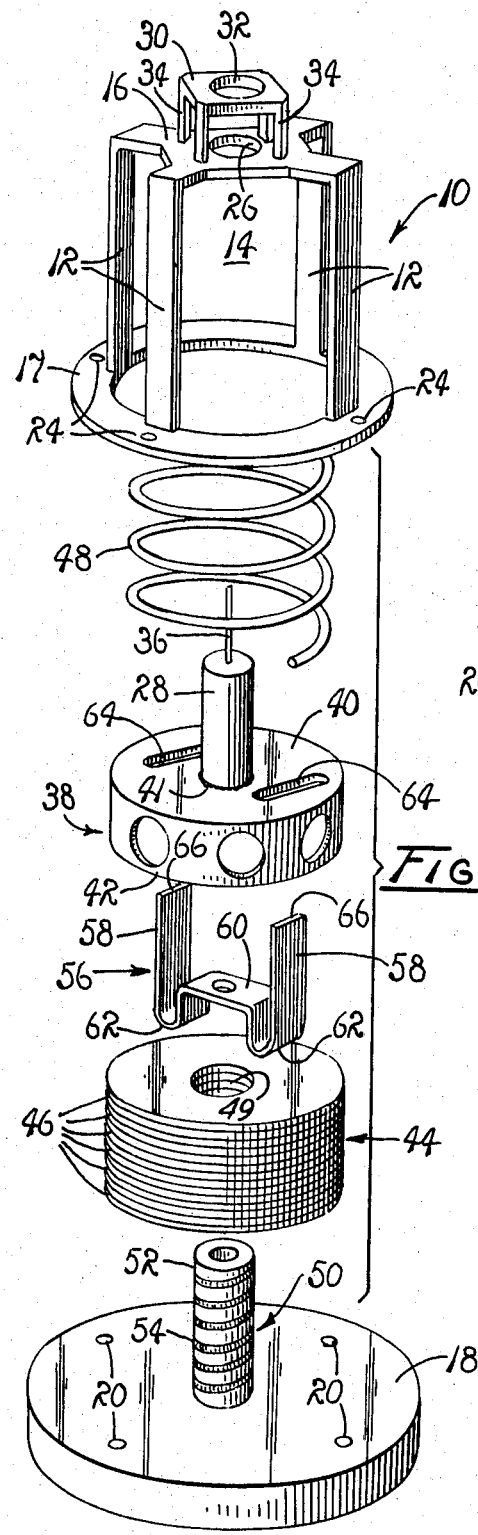
FIG. 1 is an exploded, perspective view of a thermostatic actuator embodying the principles of the present invention.

The thermostatic actuator embodying the principles of the present invention is best shown in FIG. 1. The actuator includes a housing 10 which, for the sake of increased heat dissipation, reduced weight and minimum complexity, is formed of a plurality of parallel elongated members 12 which define therebetween an elongated chamber 14.

At the uppermost end of the housing 10, there is provided a transverse end panel 16 which serves to provides an end wall at one end of the chamber 14 and to interconnect the ends of the various members 12 to form an open-ended housing. The opposite ends of the members 12 are interconnected by a laterally extended lip 17 which circumscribes the open end portion of the housing.

Figure 2:
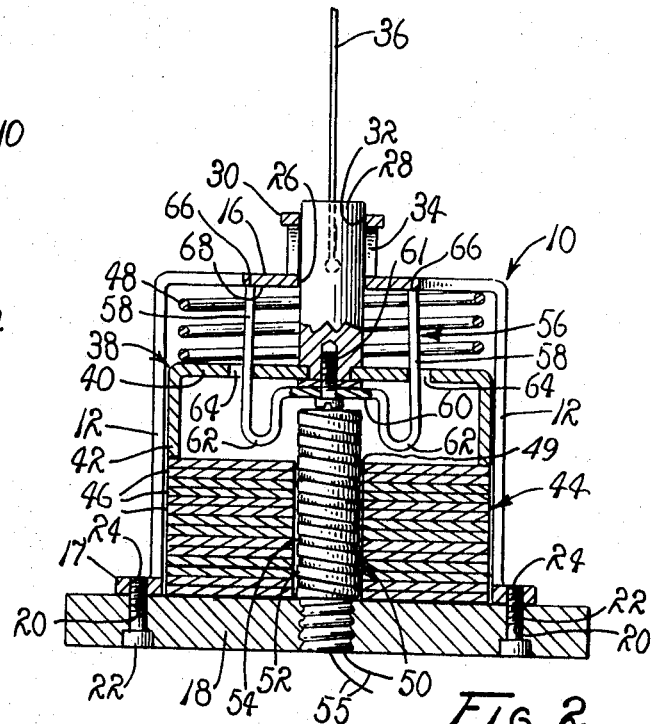
FIG. 2 is a cross section of an assembled actuator embodying the principles of the present invention, illustrating the actuator output shaft in its retracted and restrained position.

As best shown in FIG. 2, the open end of the housing 10 is closed by a planar base member 18 which extends across the opening thereof. The base member is provided with appropriately formed openings 20 extended therethrough for receiving therein elongated screws 22 which extend into a threading engagement received within convenient screw-threaded openings 24 formed within the peripheral lip 17.

As presently employed, the actuator is connected for utilization within a vacuum environment. Consequently, each of the actuator components is fabricated from a vacuum-compatible material. The base member 18 is formed of a material commercially available under the trade name of Fosterite. However, various materials such as beryllia oxide, alumina and various ceramic materials which serve as practical electrical and thermal insulators may be employed for this purpose.

The housing 10 includes an axial opening 26 extending through the end panel 16. The opening serves to receive a rectilinearly reciprocating axially displaceable output shaft 28 which is mounted for sliding engagement with the surfaces of the opening. The shaft additionally is received and supported by an external auxiliary support 30. This support includes a transverse plate 31 having formed therein an opening 32 arranged in coaxial alignment with the opening 26 through which is extended the shaft 28. The plate 31 is, in turn, supported by a plurality of conveniently arranged struts 34 which are rigidly coupled between the plate and the panel 16. Therefore, it should be appreciated that as the shaft 28 is displaced axially, misalignment thereof is precluded through the use of the auxiliary support 30.

The shaft 28 further includes, at its distal end, a coupling link 36 which serves to couple the shaft 28 into an operative relationship with any conveniently mounted mechanical linkage. Since various types of coupling links may be employed, as desired, a detailed description thereof is omitted.

At the innermost end of the shaft 28 there is fixedly secured 1 unitary coupling 38 having an inverted, cup-shaped configuration. The coupling 38 includes a transverse plate 40 secured to the innermost end of the shaft 28 in coaxial alignment therewith. The plate 40 and shaft 28 are joined by any convenient means, including a slot and soldered joint 41. Depending in a circumscribing relationship with the peripheral edge portion of the plate 40 there is a ring member 42, of uniform width, coupled with the peripheral edge portion of the plate 40 in a manner such as it is arranged in coaxial alignment therewith.

Adjacent to the coupling 38, in engagement with the transverse edge surface of the ring 42, there is disposed a heat-responsive stack 44 of individual bimetal washers 46. Since the design, function and purposes of the bimetal members are well known, a detailed description of the bimetal presently employed is omitted in the interest of brevity. However, it is to be understood that the washers are formed of layered metals, each having a different coefficient of expansion, so that for a given temperature the washers 46 assume a mutually parallel, generally flat configuration and for a different temperature the washers become deformed for thus effecting an elongation of the stack 44. As the stack 44 becomes elongated the coupling 38 is displaced, whereupon the shaft 28 is caused to be extended through the openings 26 and 32 for achieving an actuating displacement of the coupling link 36.

Figure 3:
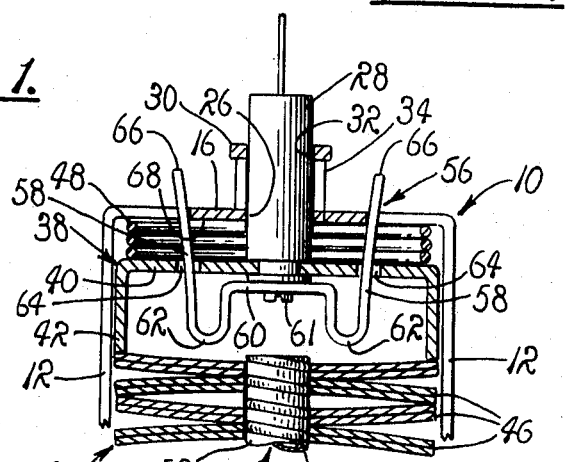
FIG. 3 is a fragmentary cross section of the actuator of FIG. 2, illustrating the output shaft in its extended position.

Mounted between the internal surface of the panel 16 and the adjacent transverse surface of the plate 40 there is a helical compression spring 48. The spring is biased continuously to urge the coupling 38 in displacement in opposition to the stack 44. Consequently, as best shown in FIG. 3, as the stack 44 is elongated through deformation and distortion of the washers 46, the spring 48 operatively is compressed. However, it should be readily apparent that as the washers 46 are returned to a state of parallelism, the spring 48 continues to act against the coupling 38 for forcing the shaft 28 in retracting displacement.

In order to achieve the desired elongation of the stack 44, through a deformation and distortion of the washers 46, there is provided an axial bore 49 extending through the stack 44. Within the bore 49 there is an electrically energizable heater 50. The heater serves to radiate and thus transfer heat to the individual washers of the stack. As presently employed, the heater 50 includes a ceramic core 52 seated in the base member 18 about which is spirally wound a tungsten resistance heating coil 54. The heating coil is connected with a conveniently available and selectively applicable voltage source, not shown, through a pair of leads 55. The design, operation and function of electrically energizable resistance heaters are well known, therefore, a detailed description thereof is omitted. However, it should be understood that the heater 50 is energized by a voltage source selectively applied thereto, whereby electrical energy is converted to heat and radiated from the coil 54. Heat thus provided is delivered to the adjacent bimetal washers for causing the individual washers to become deformed and the stack to elongate.

Where found desirable, a latch 56 is employed for positively securing the shaft 28 against an extending axial displacement. The latch 56 also is formed of a bimetal and is of a generally U-shaped configuration having a pair of spaced legs 58 extending from a transverse base member 60. In practice, the U-shaped member 56 is arranged in coaxial alignment with the shaft 28 and coupled thereto by a screw-threaded coupling screw 61. The transverse member 60 includes a pair of spaced U-shaped couplings 62 arranged at its opposite ends through which are joined the legs 58. This pair of U-shaped couplings serves to impart a desired diverging displacement of the distal ends of the legs 58 as predetermined temperatures are encountered by the latch.

The plate 40 further includes a pair of oppositely disposed slotted openings 64 through which is extended the legs 58 of the latch. The distal ends of the legs include end surfaces 66 which engage the innermost surface 68 of the panel 16, whereby the legs 58 are caused to serve as stop members for restraining the shaft 28 against axial displacement. As best illustrated in FIG. 2, when the actuator is inactivated, the legs 56 are drawn in mutually converging displacement through the effect of the U-shaped couplings 62 so that the end surfaces 66 of the legs 58 are positioned in engagement with the innermost surface 68 of the end panel 16. However, as shown in FIG. 3, upon being heated so that deformation of the individual discs 46 of the stack 44 is effected, the legs 58 are divergingly displaced for disengaging the surface 68 so that the stack 44, as it is elongated, functions to impart a driving force to the coupling 38 for thereby extending the shaft 28. As heat is radiated from the stack 44, the individual washers 46 are cooled and assume a mutually parallel relationship and the spring 48 becomes effective for displacing the coupling 38 in a shaft-retracting direction. As the coupling is displaced by the spring, the shaft is retracted to its initial position wherein the distal ends of the legs 58 again are caused to seat against the internal surface 68 of the end panel 16 for again restraining the shaft against axial displacement.

OPERATION

It is believed that in view of the foregoing description, the operation of the device will be readily understood and it will be briefly reviewed at this point. With the actuator embodying the principles of the present invention assembled in the manner herein described, the actuator is mounted on a selected structure and coupled in a driving relationship with selected mechanical linkage through the link 36. With the actuator so mounted and coupled, the legs 58 initially are arranged in a converging configuration wherein the distal end surfaces 66 are in an engaging relationship with the internal surface 68 of the panel 16.

When an extension of the shaft 28 is desired, a convenient circuit is closed for applying a voltage across the leads 55 for delivering electrical energy through the heater coils 54. As the coil 54 is heated, radiation occurs and the temperature of the adjacent bimetal members of the stack 44 and the latch member 56 is elevated whereby the legs 56 are divergingly displaced. Concurrently, the individual bimetal washers 46 are deformed for effecting an elongation of the stack. As the legs are displaced into a diverging relationship, the surface 68 is disengaged at the distal end surfaces 66 of the legs 58. Once disengagement of the surface 68 is achieved, elongation of the stack 44 is accommodated whereupon displacement of the coupling 38, in a shaft-extending direction against the bias of the spring 48, is achieved. So long as the heater 50 remains in a radiating mode, the shaft 28 remains extended. However, when the heater 50 is deenergized and the radiated heat is given up by the stack, the individual washers 46 return to a state of parallelism, whereupon the spring 48 becomes effective for driving the coupling 38 in a shaft-retracting direction for retracting the shaft 28 relative to the housing 10. As the shaft 28 is seated in its retracted disposition, the distal end surfaces 66 of the latch member 58 are extended into a shaft-restraining engagement with the stop surfaces 68.

Although the invention has been herein shown and described in what is conceived to be the most practical and preferred embodiment, it is recognized that departures may be made therefrom within the scope of the invention.

What we claim is:
1. A linear actuator including:
  A. an actuator housing;
  B. an actuator output shaft supported for rectilinear reciprocation relative to said housing;
  C. a heat-responsive drive means comprising a stack of superimposed and engaged bimetal members having an axial bore extended therethrough operatively coupled with the output shaft and adapted to respond to given changes in temperature for displacing the shaft in preselected directions;
  D. a heat-responsive latch coupled with said shaft and adapted to restrain the shaft against displacement at given temperatures and to respond to predetermined changes in temperature for releasing said shaft for linear displacement; and
  E. selectively operable heat transfer means, including a cylindrical resistance heater coil inserted within said bore, for selectively imparting changes in temperature to said latch and to said drive means for selectively achieving displacement of said shaft.

2. The actuator of claim 1 wherein the latch comprises:
A. a U-shaped member formed of a bimetal having a pair of legs spaced at a distance dictated by the temperature of the member and extended along opposite sides of the shaft; and
B. means defining a stop surface formed on the housing near the distal ends of the legs in a manner such that the distal end surfaces are caused to engage the stop surface at a first temperature and to disengage the stop surface at a second temperature.

3. A linear actuator comprising:
A. an actuator housing including means defining therein an annulus;
B. an actuator output shaft supported for rectilinear, axial displacement within said annulus;
C. a thermally responsive actuator stack, including a plurality of superimposed, thermally responsive bimetal plates seated within said housing and adapted to expand and contract as the temperature thereof is varied;
D. coupling means operatively coupled with said shaft and with said stack adapted to respond to an expansion of said stack and impart axial displacement to said shaft; and
E. a thermally responsive, shaft-restraining latch including a generally U-shaped member formed of a bimetal material having a transverse base and a pair of upstanding legs fixedly coupled with the shaft near one end thereof with the distance between the legs being a function of the temperature thereof for restraining the shaft against displacement at given temperatures and for releasing the shaft for axial displacement through said annulus in response to selected changes in temperature.

4. The actuator according to claim 3 wherein the latch further includes:
A. means defining a pair of stop surfaces formed internally of said housing being engageable with distal end surfaces of said legs in the presence of predetermined temperature conditions; and
B. means defining a pair of spaced openings adjacent said stop surfaces adapted to receive the distal ends of said legs for displacement therethrough in the presence of elevated temperature conditions, whereby the shaft is restrained against axial displacement when the latch is at a first given temperature and released for axial displacement when the latch is at a second given temperature.

5. The actuator according to claim 4 wherein said coupling means comprises a rigid coupling member secured to said shaft and extending into engagement with the face portion of an adjacent bimetal plate of said stack, whereby as the stack is caused to expand, displacement is imparted to said coupling member for axially displacing said shaft through said bore in a shaft-extending direction.

6. The actuator according to claim 5 wherein biasing means operatively are coupled with said shaft for continuously urging the shaft in shaft-retracting displacement.

7. The actuator according to claim 6 further comprising a selectively operable heater coupled with said stack adapted to transfer heat to the bimetal plates and to the U-shaped member at selected rates.

8. The actuator according to claim 7 wherein the stack further includes means defining an axial bore extending therethrough and the heater includes a cylindrical, electrically energizable resistance coil extended into said bore and adapted to radiate heat at selected rates.